United States Patent Office 3,674,525
Patented July 4, 1972

3,674,525
PLASTICIZED SULFUR COMPOSITIONS
Rector P. Louthan, Bartlesville, Okla., assignor to
Phillips Petroleum Company
No Drawing. Filed Feb. 25, 1970, Ser. No. 14,195
Int. Cl. C07g; C08h; C09k
U.S. Cl. 106—287 SC         6 Claims

ABSTRACT OF THE DISCLOSURE

The viscosity of plasticized sulfur compositions comprising elemental sulfur plasticized with an organic sulfur-plasticizing agent is reduced by the addition of a modifying amount of an unsaturated acid or unsaturated acid anhydride to the plasticizing agent prior to its use for plasticizing sulfur.

This invention relates to a new composition of matter and a method for preparing said composition.

Blending elemental sulfur with a suitable plasticizing material, generally an organic material which reacts at least in part with the sulfur, produces a plasticized composition which has a number of uses. The use of such compositions as road-marking material, coatings for buildings, and other similar uses requiring durability is steadily increasing. Such compositions are frequently quite viscous because of the presence of substances such as pigments or fillers. As a result, it is difficult to apply such compositions to surfaces at a rapid rate, as, for example, in a spraying operation.

It is an object of this invention to reduce the viscosity of plasticized sulfur compositions. Another object is to make plasticized sulfur compositions suitable for spraying and other rapid application operations. Another object is to provide a durable plasticized sulfur composition that is easy to apply, dries quickly, and remains durable for long periods of time.

Other aspects, objects and advantages of the invention will be readily apparent to those skilled in the art after a reading of the specification and claims.

In accordance with the present invention, novel plasticized sulfur compositions are provided which are formed by modification of the sulfur plasticizing agent, prior to its use in plasticizing the sulfur, by adding thereto a modifying amount of an unsaturated acid or unsaturated acid anhydride.

More specifically, in one presently preferred embodiment of this invention, I have discovered that plasticized sulfur compositions having reduced viscosity are formed by utilizing as the plasticizing agent an organodithiol plasticizing agent which has been previously modified by the addition thereto of a modifying amount of an unsaturated acid or an unsaturated acid anhydride.

In modifying the plasticizing agent in accordance with the invention, the modifying agent employed is at least one unsaturated monoacid of the formula $C_nH_{2n-1}COOH$ or unsaturated diacid of the formula $C_nH_{2n-2}(COOH)_2$ or anhydrides thereof, wherein $n$ is 2 to 20. Examples of unsaturated mono- and diacids and acid anhydrides suitable for use in the modification of the plasticizer in accordance with the invention are those selected from the group consisting of acrylic acid, maleic acid, crotonic acid, vinyl acetic acid, oleic acid, eicosenoic acid, heneicosenoic acid, 3,3-dimethyloleic acid, and the corresponding anhydrides thereof such as maleic anhydride and the like.

The term "modifying amount" as used herein is intended to mean that amount of modifying agent—the unsaturated acid or acid anhydride—which will result in the exhibition of a reduced viscosity in the resulting plasticized sulfur composition. The amount of modifying agent added to the plasticizer is generally in the range of from 1 to 10 parts per 100 parts by weight of the plasticized sulfur. The acid or anhydride modifier can be added at any time to the plasticizing agent. However, it is preferable to charge the acid or anhydride modifying agent during preparation of the plasticizer.

Thus, in one particular embodiment of this invention, a modifying amount of the acid or acid anhydride is charged to the reactor system wherein ethylcyclohexanedithiol (ECH dithiol) is prepared for use as the plasticizer.

The plasticized sulfur compositions of the present invention are comprising elemental sulfur which has been treated with a modified plasticizing material to provide a material having satisfactory adhesion and durability properties while being of such viscosity as to be readily employed in conventional application techniques.

The modified plasticizing materials are formed by the addition of an unsaturated acid or unsaturated acid anhydride as above defined to a polythiol having the formula $Y(SH)_x$ wherein $x$ is an integer selected from the group consisting of 2, 3 and 4, preferably 2 or 3, and Y is a radical having a valence of $x$ and containing 2 to 30, preferably 2 to 20, carbon atoms, each of said carbon atoms preferably having attached thereto not more than one SH group, said radical Y being selected from the group consisting of (a) radicals containing carbon and hydrogen only, (b) radicals containing carbon, hydrogen and oxygen only, the oxygen being present as ether linkages, and (c) radicals containing carbon, hydrogen and sulfur only, the sulfur being present as monosulfide linkages. Radicals containing carbon and hydrogen only include saturated aliphatic, unsaturated aliphatic, saturated cycloaliphatic, unsaturated cycloaliphatic, and aromatic radicals and combinations thereof. Radicals containing carbon, hydrogen and oxygen only, the oxygen being present as ether linkages, include saturated aliphatic, unsaturated aliphatic, saturated cycloaliphatic and unsaturated cycloaliphatic radicals and aromatic radicals and combinations thereof. Radicals containing carbon, hydrogen and sulfur only, the sulfur being present as sulfide linkages, include saturated and unsaturated hydrocarbyl radicals in which one or more methylene groups not adjacent to the thiol groups in the molecule are replaced by monosulfide linkages, said monosulfide linkages being separated by at least one carbon atom when more than one monosulfide linkage is present, and the number of said monosulfide linkages preferably not exceeding 10. The polythiol is free from polysulfide linkages. Mixtures of such polythiols can be employed.

If desired, a basic catalyst can be employed in the preparation of such plasticized compositions. Catalysts such as amines, ammonia and the oxides, hydroxides and carbonates of lithium, sodium, potassium, rubidium, cesium, magnesium, calcium, strontium and barium can be used. The amines can be primary, secondary or tertiary, and they can contain saturated or unsaturated aliphatic or cycloaliphatic groups or aromatic groups, or combinations thereof, in the molecule. Heterocyclic amines are included among the applicable amines. The concentration of basic catalyst is not critical, but the catalyst can be employed in an amount equivalent to 0.01 to 5 parts by weight per 100 parts by weight of sulfur.

Although the compositions are preferably prepared in the absence of added solvent, suitable solvents such as chloroform, carbon tetrachloride, benzene, toluene and xylene can be used. The reaction temperature is generally maintained within the range of about −20 to 250° C., preferably within the range of about 20 to 200° C. The reaction period varies, depending on the temperature and on the nature and concentration of the compounds in the reaction system, but should be in the range of about 1 minute to about 2 days, usually being within the range of about 3 minutes to about 4 hours. The pressure need be sufficient only to maintain the polythiols and solvent, if used, substantially in the liquid phase. Hydrogen sulfide, which is evolved during the reaction, can be removed as it is formed. If a solvent is used, the solvent can be removed by volatilization upon completion of the reaction.

Plasticization of the sulfur to form marking compositions can be carried out through the use, for example, of modified 3 - (2-mercaptoethyl)cyclohexanethiol or 4-(2-mercaptoethyl)cyclohexanethiol, used alone or in combination. The unmodified dithiol can be readily prepared, e.g. by the method disclosed in U.S. Pat. 3,050,452. The modified polythiol is prepared in accordance with the instant invention as herein described.

The ratio of modified thiols (plasticizing agent) to sulfur can vary within a broad range but will usually be within the range of about 3 to 20 parts by weight of thiol to 100 parts by weight of sulfur, preferably within the range of about 5 to 20 parts by weight of thiol to 100 parts by weight of sulfur. The temperature at which the plasticization is carried out is generally maintained within the range of about 50–250° C., preferably within the range of about 100–200° C. The time required for the plasticization varies, depending on the nature and concentration of the components in the system and the temperature employed, but should be within the range of about 5 minutes to about 2 days, usually being within the range of about 10 minutes to about 6 hours.

Plasticized sulfur marking compositions prepared using the modified plasticizing agent of this invention can have pigments added thereto and are of sufficient whiteness and impact strength to make them ideally suitable for white marking compositions, for example in the marking of highways, streets, roads, airport landing strips and the like. Of course, other materials such as sand, glass beads and the like can be added to impart special properties sometimes desired in marking compositions.

Any filler can be employed in the preparation of plasticized compositions. In some instances, the fillers also can serve as extender pigments. Preferably, the filler is added to the plasticized sulfur containing the modifier of this invention. Thorough mixing of the filler with the plasticized sulfur is readily achieved by stirring at temperatures at which the plasticized sulfur is molten. Less preferably, the filler can be aded to the sulfur and/or to the plasticizer prior to plasticizing of the sulfur.

Fillers suitable for use in the plasticized compositions are selected from a group consisting of silica, bentonite, china clay, titanium dioxide, barium sulfate, barium carbonate, calcium carbonate, calcium sulfate, magnesium silicate, magnesium oxide, magnesium carbonate, graphite, carbon black, glass fibers, metal powders, asbestos, wood flour, cotton floc, alpha cellulose, mica, pyrophyllite, pumice, diatomite, alumina hydrate, calcium silicate, and the like.

The filler is present in the range of from about 1 to about 50 parts by weight per 100 parts by weight of plasticized sulfur.

The plasticized sulfur compositions resulting from this invention have a viscosity level which permits the use of rapid application techniques. Specifically, viscosities can range from about 100 centipoises to about 800 centipoises when measured at about 150° C.

The following example will further illustrate the invention, although it is not intended that the invention be limited thereto.

EXAMPLE

A series of modified sulfur plasticizer compositions were formed from a mixture of ethylcyclohexanedithiol (ECH dithiol) and modifier, as indicated below, and sulfur by charging the materials to a stirred vessel warmed by a 315° F. oil bath for 3 hours. Thereafter, the resulting product was deodorized by stripping in admixture with a thinner and kerosene.

The following formulation was employed in carrying out the above process:

| Formulation designation | A | B | C (Control) |
| --- | --- | --- | --- |
| Plasticizier preparation: | | | |
| ECH dithiol, parts | 14.0 | 14.0 | 14.0 |
| Sulfur, parts | 10.5 | 10.5 | 10.5 |
| Modifier | (¹) | (²) | None |
| Modifier, parts | 2 | 2 | 0 |
| Reaction time, hours | 3 | 3 | 3 |
| Reaction temperature, ° F | 300 | 300 | 300 |
| Deodorization Charge: | | | |
| Plasticizer (from above), parts | 23.1 | 23.1 | 23.1 |
| Thinner (partially hydrogenated terphenyls), parts | 12.5 | 12.5 | 12.5 |
| Kerosene | 9.0 | 9.0 | 9.0 |
| Stripping time, hours | 1 | 1 | 1 |
| Stripping temperature, ° F | 300 | 300 | 300 |
| Stripping pressure, mm | 5 | 5 | 5 |

¹ Acrylic acid.
² Maleic Anhydride.

Utilizing each of the plasticizing agents A, B and C, plasticized sulfur compositions were prepared by charging thereto the following formulation:

| Material charged: | Parts |
| --- | --- |
| Sulfur | 76.9 |
| Amorphous silica ¹ | 40.0 |
| Titanium dioxide ² | 20.0 |

¹ Tamms Gold Bond–R.
² Du Pont R–101.

The charged materials were stirred together in a 500-ml. beaker in an oil bath at 250° F. for 1 hour. Melt viscosity was thereafter determined for each resulting composition. The following results were obtained:

| Formulation: | Melt viscosity (Z–5 sec.) ¹ |
| --- | --- |
| A | 18 |
| B | 20 |
| C | Too viscous to measure |

¹ The Zahn cup No. 5 with a 0.208-inch diameter orifice was used and the measurement reported in Zahn seconds (Z–5).

The above data clearly demonstrate that utilization of the unsaturated acid or anhydride as a plasticizer modifier permits the formation of a plasticized sulfur composition of reduced viscosity in accordance with this invention.

Reasonable variations and modifications are possible in the foregoing specification without departing from the spirit or scope thereof.

I claim:

1. A plasticized sulfur composition of reduced viscosity which forms on mixing elemental sulfur with from 3 to about 30 parts by weight of a modified organic sulfur-plasticizing agent per 100 parts of elemental sulfur, said modified organic sulfur-plasticizing agent having been formed by the addition to ethylcyclohexanedithiol of from 1 to 10 parts of acrylic acid per 100 parts of platsicized sulfur.

2. The composition of claim 1 further comprising from about 1 to 50 parts of an inorganic filler per 100 parts of plasticized sulfur.

3. The composition of claim 2 wherein said filler is selected from the group consisting of silica, bentonite, china clay, titanium dioxide, barium sulfate, barium carbonate, calicum carbonate, calcium sulfate, magnesium silicate, magnesium oxide, magnesium carbonate, graphite, carbon black, glass fibers, metal powders, asbestos, wood flour, cotton floc, alpha cellulose, mica, pyrophyllite, pumice, diatomite, alumina hydrate, and calcium silicate.

4. A plasticized sulfur composition of reduced viscosity which forms on mixing elemental sulfur with from 3 to about 30 parts by weight of a modified organic sulfur-plasticizing agent per 100 parts of elemental sulfur, said modified organic sulfur-plasticizing agent having been formed by the addition to ethylcyclohexanedithiol of from 1 to 10 parts of maleic anhydride per 100 parts of plasticized sulfur.

5. The composition of claim 4 further comprising from about 1 to 50 parts of an inorganic filler per 100 parts of plasticized sulfur.

6. The composition of claim 5 wherein said filler is selected from the group consisting of silica, bentonite, china clay, titanium dioxide, barium sulfate, barium carbonate, calcium carbonate, calcium sulfate, magnesium silicate, magnesium oxide, magnesium carbonate, graphite, carbon black, glass fibers, metal powders, asbestos, wood flour, cotton floc, alpha cellulose, mica, pyrophyllite, pumice, diatomite, alumina hydrate, and calcium silicate.

References Cited
UNITED STATES PATENTS

| | | | |
|---|---|---|---|
| 2,142,145 | 1/1939 | Patrick | 106—287 S X |
| 2,331,951 | 10/1943 | Wright et al. | 106—287 S X |
| 2,799,593 | 7/1957 | Seymour et al. | 106—287 S |
| 3,020,252 | 2/1962 | Hancock | 106—287 S |
| 3,306,000 | 2/1967 | Barnes | 106—286 X |
| 3,316,115 | 4/1967 | Barnes et al. | 106—287 S |
| 3,342,620 | 9/1967 | Molinet et al. | 106—287 S |
| 3,421,911 | 1/1969 | Greco et al. | 106—19 |
| 3,434,852 | 3/1969 | Louthan | 106—19 |
| 3,453,126 | 7/1969 | Greco et al. | 106—19 |

JOAN B. EVANS, Primary Examiner

U.S. Cl. X.R.

106—19; 260—79.5 C